United States Patent
Shen (10) Patent No.: US 9,097,794 B2
(45) Date of Patent: Aug. 4, 2015

(54) ULTRASOUND DOPPLER DETECTION METHOD WITH GOLAY CODE EXCITATION

(71) Applicant: NATIONAL TAIWAN UNIVERSITY, Taipei (TW)

(72) Inventor: Che-Chou Shen, Taipei (TW)

(73) Assignee: National Taiwan University, Taipei (TW)

( * ) Notice: Subject to any disclaimer, the term of this patent is extended or adjusted under 35 U.S.C. 154(b) by 331 days.

(21) Appl. No.: 13/888,568

(22) Filed: May 7, 2013

(65) Prior Publication Data

US 2014/0286132 A1   Sep. 25, 2014

(30) Foreign Application Priority Data

Mar. 20, 2013   (TW) .............................. 102109830 A (51) Int. Cl.
| | |
|---|---|
| G08B 1/08 | (2006.01) |
| G08B 5/22 | (2006.01) |
| G01S 15/00 | (2006.01) |
| G01S 19/00 | (2010.01) |
| G01S 19/41 | (2010.01) |
| G01S 19/42 | (2010.01) |
| G01S 15/02 | (2006.01) |

(52) U.S. Cl.
CPC ...................................... *G01S 15/02* (2013.01)

(58) Field of Classification Search
None
See application file for complete search history.

(56) References Cited

U.S. PATENT DOCUMENTS

| | | | |
|---|---|---|---|
| 7,471,241 B1* | 12/2008 | Yang ........................ | 342/357.73 |
| 7,623,064 B2* | 11/2009 | Calderbank et al. .......... | 342/188 |
| 2014/0105054 A1* | 4/2014 | Saegrov et al. ................ | 370/252 |
| 2014/0369176 A1* | 12/2014 | Rudershausen ............... | 370/209 |

\* cited by examiner

*Primary Examiner* — Jennifer Mehmood
*Assistant Examiner* — Pameshanand Mahase
(74) *Attorney, Agent, or Firm* — Rosenberg, Klein & Lee (57) ABSTRACT

An ultrasound Doppler detection method with Golay-encoded excitation is used to obtain the flow information of a moving object. A first Golay code is transmitted to the moving object for a reflection signal of the first Golay code and a second Golay code is transmitted to the moving object for a reflection signal of the second Golay code after waiting for a pulse repetition interval. The received reflection signals are match-filtered to generate a first and a second wave. The above steps are repeated several times. Then, a slow-time filter in the Doppler frequency domain whose low-pass cut-off frequency is a quarter of the pulse repetition frequency is used to filter out the first sidelobes of the first waves and the second sidelobes of the second waves. Finally, the ultrasound Doppler detection is formed according to the first mainlobes of the first waves and the second mainlobes of the second waves.

7 Claims, 6 Drawing Sheets

ULTRASOUND DOPPLER DETECTION METHOD WITH GOLAY CODE EXCITATION

This application claims the benefits of the Taiwan Patent Application Serial NO. 102109830 filed on Mar. 20, 2013, the subject matter of which is incorporated herein by reference.

BACKGROUND OF THE INVENTION

1. Field of the Invention

The present invention relates to an ultrasound Doppler detection method with Golay coded excitation and more particularly, relates to an ultrasound Doppler detection method with Golay coded excitation by a filter filtering out waves in a Doppler frequency domain of a slow-time.

2. Description

The technique of generating images by means of ultrasound has been widely adopted in biomedical applications. Compared with other medical imaging systems such as X-ray, computed tomography (CT), magnetic resonance imaging (MRI) and nuclear medicine imaging utilized in clinic, ultrasonic imaging has advantages of cost effectiveness, non-invasiveness, no ionizing radiation, real-time imaging capability, high spatial resolution (less than 1 millimeter), portability, flow estimation ability, etc. Thus, ultrasound imaging has been commonly applied to clinical diagnosis in several medical categories.

Ultrasonic Doppler detection system is utilized for imaging, wherein the Doppler effect is utilized to determine whether a certain structure (usually blood flow) moves toward or away from a probe, to calculate its relative speed, and to determine its direction and speed for imaging by calculating a frequency drift of the volume of a partial sample (e.g. jet blood flow above the heart valve). According to said ultrasonic Doppler detection system, sinusoidal waves of ultrasound are transmitted and received for imaging.

However, since ultrasound is mechanical wave, sound pressure may generate heat and cavitation effects damaging human body. Besides, the amplitude of ultrasound is so great that nonlinear phenomenon is easily generated, which affects the quality of imaging. Thus, in medical applications of ultrasound, the amplitude of sound pressure of ultrasound is limited within the regulation of Medical Index. As a result, there are disadvantages such as low Signal to Noise Ratio (SNR) and low transmittance in ultrasound Doppler detection system.

The technology of code excitation is utilized for improving the limits of SNR of ultrasound Doppler detection system by means of phase modulation and frequency modulation. Coded waves are designed with longer transmission time and averagely low sound pressure. A result of short and high sound pressure is obtained after the coded waves are received, decoded and compressed so that the SNR and resolution of the Doppler detection are improved. There are two parts in the coded waves after compression, mainlobe and sidelobe. Sidelobe will cause artifacts and thus will affect the result of the Doppler detection system with the code excitation.

Phase encoding is utilized in Golay code of said code excitation. Phase encoding has advantages such as improving the energy of the mainlobe and completely inhibiting signals of sidelobe. On transmission end, a pair of complementary coded signals is transmitted. The signals are received at the receiving end and compressed via corresponding matched filter so as to remove sidelobe and enhance the strength of mainlobe. Compared with other coded waves, Golay code is relatively easy in terms of design and process of hardware, which can effectively reduce production cost and is beneficial for manufacturing smaller instruments.

Theoretically speaking, sidelobe signals should be completely inhibited by means of Golay code, which sums up complementary codes; however, practically speaking, when observing moving objects, the ability of summing up complementary codes for inhibiting sidelobe signals is greatly weakened and residual sidelobe signals caused will affect the precision of the Doppler detection method. Therefore, it can only be applied for slowly moving instead of fast moving objects such as high speed moving blood flow. As a result, Golay code is usually deemed as not suitable for Doppler detections.

SUMMARY OF THE INVENTION

When applying Golay code in Doppler detection method, the ability of summing up complementary codes for inhibiting sidelobe signals is greatly weakened and residual sidelobe signals are generated when observing moving objects. Thus, an ultrasound Doppler detection method with Golay coded excitation is provided and the method is not only suitable for detecting slow moving objects but also fast moving objects. According to an embodiment of the present invention, two Golay coded signals are transmitted every pulse repetition interval (PRI) repeatedly; a filter with a cut-off frequency of a quarter of a pulse repetition frequency (PRF) is designed in a Doppler frequency domain of a slow-time; and the filter filters out reflected Golay coded signals in slow-time, which makes Golay code suitable for ultrasound Doppler detection system.

According to an embodiment of the present invention, an ultrasound Doppler detection method with Golay-encoded excitation for obtaining flow information of a moving object is provided. The method includes following steps: (a) transmitting a first Golay code to the moving object for a first reflection signal; (b) after a pulse repetition interval, transmitting a second Golay code to the moving object for a second reflection signal, wherein the reciprocal of the pulse repetition interval is a pulse repetition frequency; (c) repeating step (a) and then step (b) for N times to obtain 2×N reflection signals sequentially, wherein the first reflection signals are obtained in odd number of N times and the second reflection signals are obtained in even number of N times; (d) performing a first match-filtering on the first reflection signals to generate N first waves and performing a second match-filtering on the second reflection signals to generate N second waves, wherein each of the first waves includes a first mainlobe and a plurality of first sidelobes, and each of the second waves includes a second mainlobe and a plurality of second sidelobes; (e) analyzing the first waves and the second waves in a Doppler frequency domain of a slow-time to generate a Doppler wave, wherein the Doppler wave includes a mainlobe part and at least a sidelobe part, the mainlobe part includes the first mainlobe and the second mainlobe, and the sidelobe part includes the first sidelobes and the second sidelobes; (f) low-pass filtering the Doppler wave by a filter, filtering out the sidelobes, wherein a low-pass cut-off frequency of the filter is a quarter of the pulse repetition frequency; and (g) forming the ultrasound Doppler detection according to the mainlobe part remained, and obtaining flow information of the moving object, wherein the flow information is selected from the group of a flow speed and a flow direction.

Furthermore, according to an embodiment of the present invention, in step (d), the first match-filtering and the second match-filtering are performed in a fast-time. Besides, the first waves and the second waves alternatively appear in the slow-time, wherein the first mainlobe and its adjacent second mainlobe are in-phase waves, and the first sidelobes and their adjacent second sidelobes are out-of-phase waves. Hence, in slow-time, the difference between the sidelobe part and the mainlobe part is half of the pulse repetition frequency. Meanwhile, the first mainlobe and the second mainlobe include a center frequency and a half bandwidth, and the sum of the center frequency and the half bandwidth is less than a quarter of the pulse repetition frequency.

In conclusion, the ultrasound Doppler detection method with Golay-encoded excitation according to embodiments of the present invention provides a choice of not loosing the strength of mainlobes and resolutions by a slow-time filtering in Doppler frequency domain to filter out sidelobes generated due to the compression of Golay code. As a result, Golay code can be utilized in Doppler detections for high speed blood flow and remaining the precision of flow information (e.g. blood flow speed or blood flow position) in Doppler detections.

BRIEF DESCRIPTION OF THE DRAWINGS

Other features and advantages of this invention will become more apparent in the following detailed description of the preferred embodiments of this invention, with reference to the accompanying drawings.

DETAILED DESCRIPTION OF THE PREFERRED EMBODIMENT

The present invention relates to an ultrasound Doppler detection method with Golay coded excitation. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
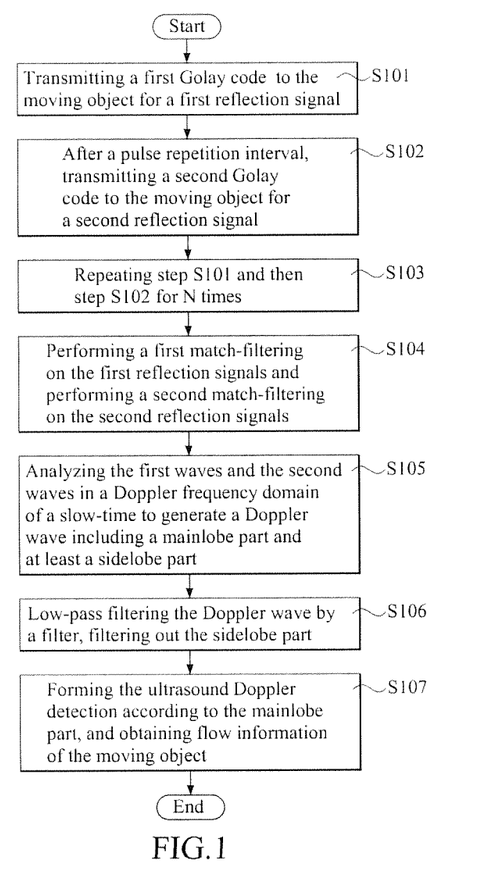
FIG. 1 is a flow chart of an ultrasound Doppler detection method with Golay coded excitation according to an embodiment of the present invention.
Figure 2:
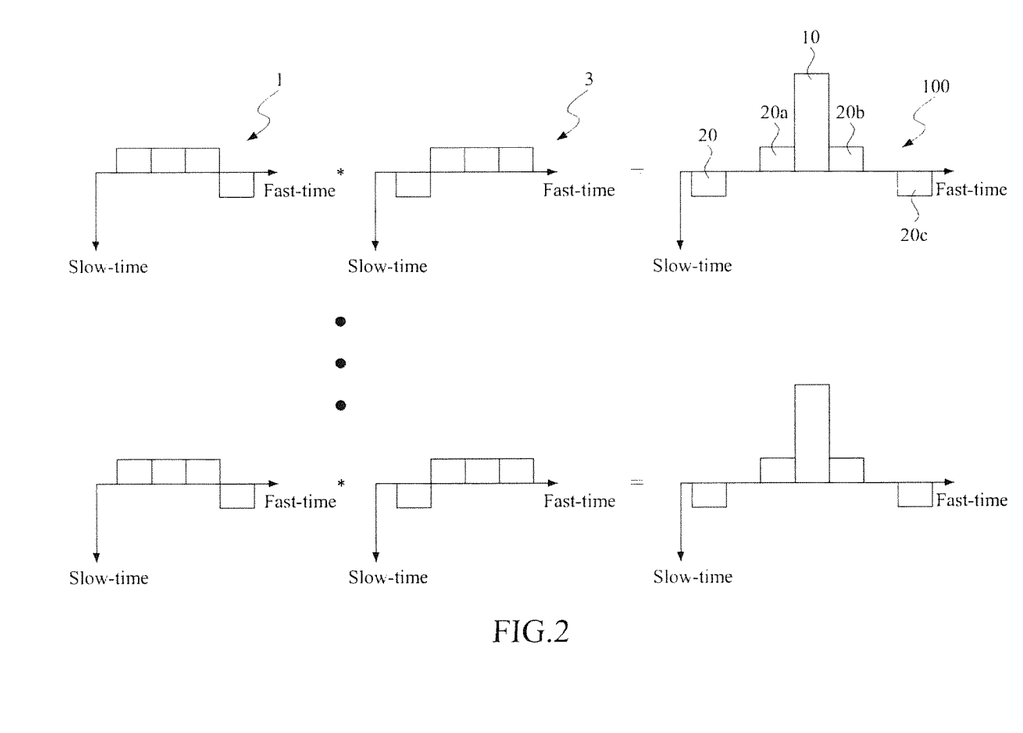
FIG. 2 is a schematic view of forming N first waves according to an embodiment of the present invention.
Figure 2A:
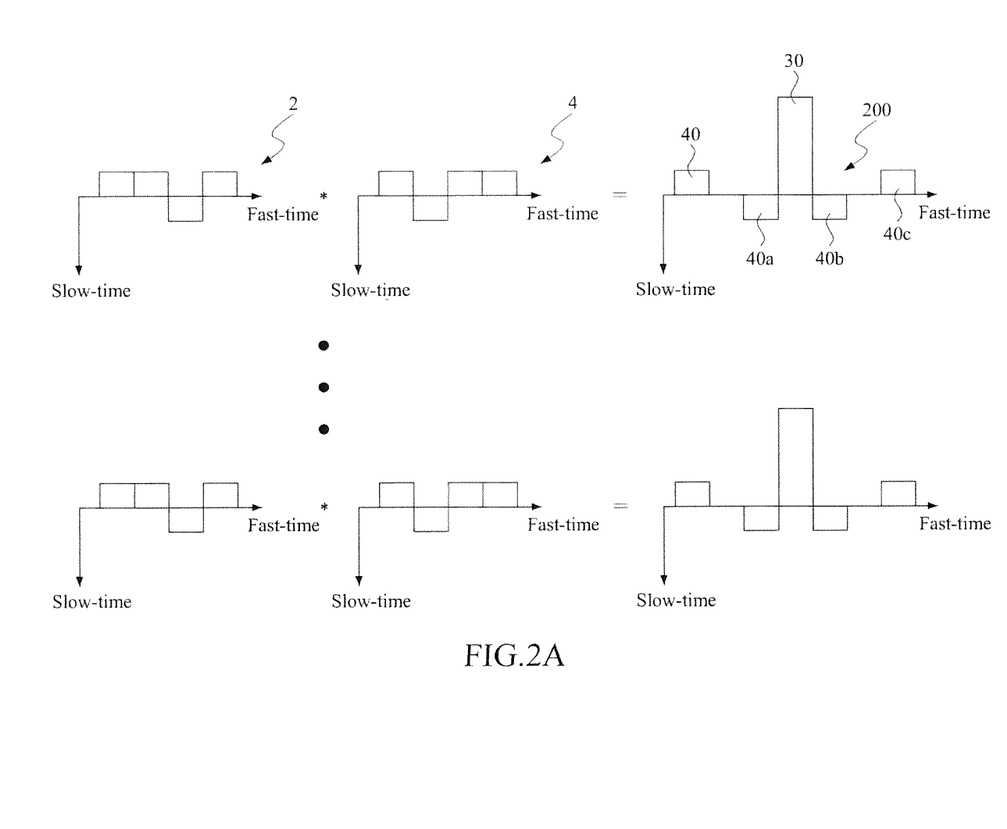
FIG. 2A is a schematic view of forming N second waves according to an embodiment of the present invention.
Figure 2B:
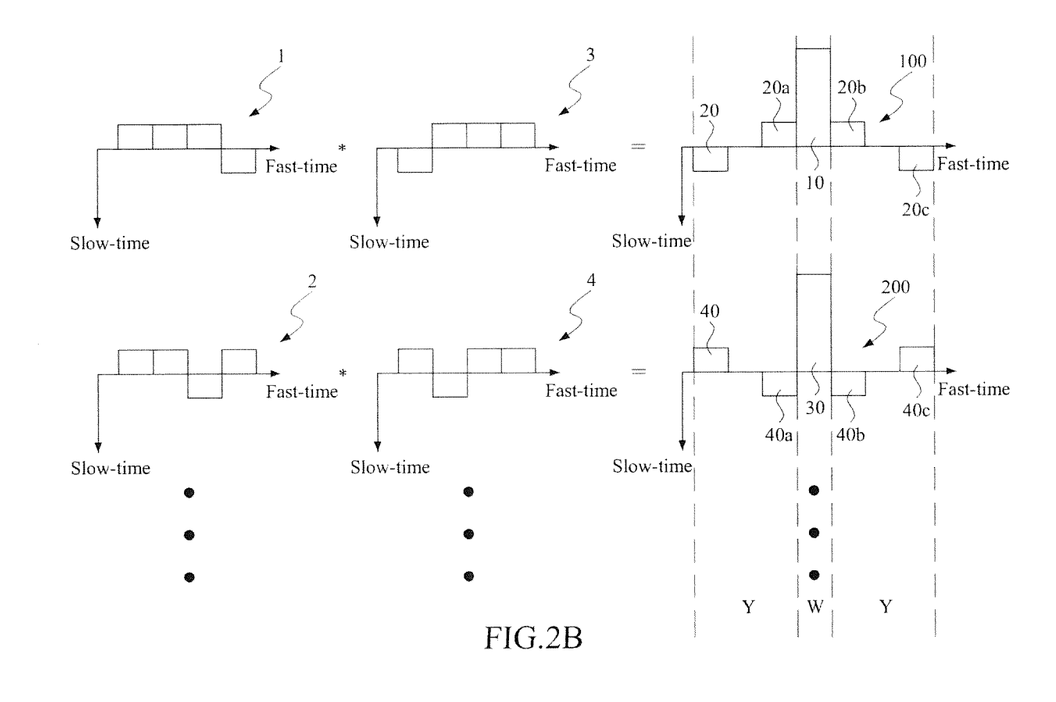
FIG. 2B is a schematic and combined view of N first waves and N second waves according to an embodiment of the present invention.
Figure 3:
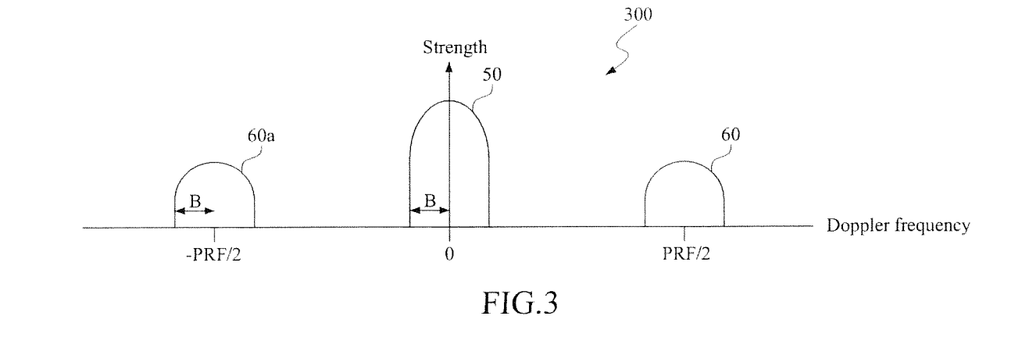
FIG. 3 is a schematic spectrum of Doppler showing a mainlobe part and sidelobe parts according to an embodiment of the present invention.
Figure 4:
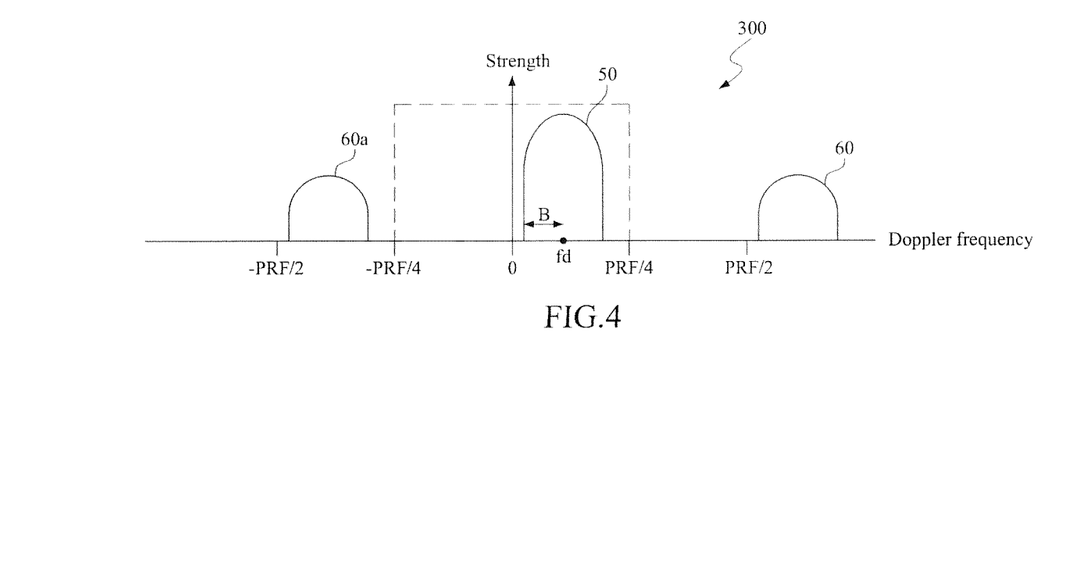
FIG. 4 is a schematic spectrum showing filtering out a moving object according to an embodiment of the present invention.

Refer to FIG. 1, FIG. 2, FIG. 3 and FIG. 4. FIG. 1 is a flow chart of an ultrasound Doppler detection method with Golay coded excitation according to an embodiment of the present invention; FIG. 2 is a schematic view of forming N first waves according to an embodiment of the present invention; FIG. 2A is a schematic view of forming N second waves according to an embodiment of the present invention; FIG. 2B is a schematic and combined view of N first waves and N second waves according to an embodiment of the present invention; FIG. 3 is a schematic spectrum of Doppler showing a mainlobe part and sidelobe parts according to an embodiment of the present invention; and FIG. 4 is a schematic spectrum showing filtering out a moving object according to an embodiment of the present invention.

According to an embodiment of the present invention, an ultrasound Doppler detection method with Golay-encoded excitation for obtaining flow information of a moving object is provided. The flow information is selected from the group of a flow direction and a flow speed. The method includes following steps:

S101: transmitting a first Golay code to the moving object for a first reflection signal;

S102: after a pulse repetition interval, transmitting a second Golay code to the moving object for a second reflection signal;

S103: repeating step S101 and then step S102 for N times;

S104: in fast-time, performing a first match-filtering on the first reflection signals and performing a second match-filtering on the second reflection signals;

S105: analyzing the first waves and the second waves in a Doppler frequency domain of a slow-time to generate a Doppler wave including a mainlobe part and at least a sidelobe part;

S106: low-pass filtering the Doppler wave by a filter, filtering out the sidelobe part; and S107: forming the ultrasound Doppler detection according to the mainlobe part, and obtaining flow information of the moving object.

According to an embodiment of the present invention, in step S101, the first Golay code (not shown) is transmitted to the moving object for the first reflection signal 1 (as shown in FIG. 2), wherein the moving object includes blood flow moving in high speed. According to an embodiment of the present invention, the first reflection signal 1 includes a signal code of [1, 1, 1, −1].

According to an embodiment of the present invention, in step S102, the second Golay code (not shown) is transmitted to the moving object for the second reflection signal 2 (as shown in FIG. 2A) after a pulse repetition interval, wherein the reciprocal of the pulse repetition interval is a pulse repetition frequency. According to an embodiment of the present invention, the second reflection signal 2 includes a signal code of [1, 1, −1, 1].

According to an embodiment of the present invention, in step S103, step S101 and then step S102 are repeated for N times, and more particularly, 2×N reflection signals (i.e. N first reflection signals 1 and N second reflection signals 2, as shown in FIG. 2 and FIG. 2A) are sequentially obtained, wherein the first reflection signals 1 are obtained in odd number of N times and the second reflection signals 2 are obtained in even number of N times. According to an embodiment of the present invention, the N first reflection signals 1 and N second reflection signals 2 are arranged sequentially as a signal matrix; that is, the first reflection signals 1 and second reflection signals 2 are arranged alternatively.

According to an embodiment of the present invention, in step S104, the first reflection signals 1 are filtered with a first match-filtering and the second reflection signals 2 are filtered with a second match-filtering, wherein the first match-filtering is performed in fast-time (as the direction of the horizontal axis shown in FIG. 2). The first match-filtering is defined as the first reflection signals 1 and a first match-filtering signal 3 being convoluted to generate a first wave 100 as shown in FIG. 2. The first match-filtering signal 3 includes a signal code of [−1, 1, 1, 1]; the first wave 100 generated after the convolution includes a signal code of [−1, 0, 1, 4, 1, 0, −1]. Since the first match-filtering is performed on N first reflection signals 1, there will be N first waves 100. Besides, according to an embodiment of the present invention, each of the first waves 100 includes a first mainlobe 10 and four first sidelobes 20, 20a, 20b and 20c as shown in FIG. 2.

Furthermore, according to an embodiment of the present invention, the second reflection signals 2 are filtered with the second match-filtering, wherein the second match-filtering is performed in fast-time (as the direction of the horizontal axis shown in FIG. 2A). The second match-filtering is defined as the second reflection signals 2 and a second match-filtering signal 4 being convoluted to generate a second wave 200 as shown in FIG. 2A. The second match-filtering signal 4 includes a signal code of [1, −1, 1, 1]; the second wave 200 generated after the convolution includes a signal code of [1, 0, −1, 4, −1, 0, 1]. Since the second match-filtering is performed on N second reflection signals 2, there will be N second waves 200. Besides, according to an embodiment of the present invention, each of the second waves 200 includes a second mainlobe 30 and four second sidelobes 40, 40a, 40b and 40c as shown in FIG. 2A.

According to FIG. 2, FIG. 2A and FIG. 2B, it is clear that the first mainlobe 10 and the second mainlobe 30 are located in interval W and are in-phase waves; the first sidelobes 20, 20a, 20b and 20c and the second sidelobes 40, 40a, 40b, and 40c are located in interval Y and are out-of-phase waves.

According to an embodiment of the present invention, in step S105, the N first waves 100 and the N second waves 200 in FIG. 2B are analyzed in the Doppler frequency domain of slow-time to generate the Doppler wave 300 as shown in FIG. 3. The Doppler wave 300 includes a mainlobe part 50 and two sidelobe parts 60 and 60a; the mainlobe part 50 includes the first mainlobe 10 and the second mainlobe 30; the sidelobe parts 60 and 60a include the first sidelobes 20, 20a, 20b and 20c and the second sidelobes 40, 40a, 40b and 40c. According to FIG. 3 and FIG. 4, the mainlobe part 50 includes a center frequency fd (The center frequency in FIG. 3 is 0) and a half bandwidth B. The sidelobe parts 60 and 60a also include a center frequency (the center frequency is PRF/2 and −PRF/2 in FIG. 3; the center frequency is not shown in FIG. 4) and a half bandwidth B equal to the half bandwidth B of the mainlobe part 50.

According to an embodiment of the present invention, in step S106, the Doppler wave 300 is low-pass filtered by a filter included in the Doppler frequency domain of slow-time (as the direction of the vertical axis shown in FIG. 2B) to remove the sidelobe parts 60 and 60a and to keep the mainlobe part 50.

According to an embodiment of the present invention, a low-pass cut-off frequency of the filter is a quarter of the pulse repetition frequency and the filter includes a low-pass filter. Besides, the difference between the sidelobe parts 60 and 60a, and the mainlobe part 50 is half of the pulse repetition frequency. Further, the sum of the center frequency fd and the half bandwidth B of the mainlobe part 50 is less than a quarter of the pulse repetition frequency.

More specifically, according to an embodiment of the present invention, the low-pass cut-off frequency is PRF/4; the difference between the sidelobe part 60 and the mainlobe part 50 is PRF/2; the difference between the sidelobe part 60a and the mainlobe part 50 is PRF/2. That is, the center frequency of the sidelobe part 60 is PRF/2; and the center frequency of the sidelobe part 60a is −PRF/2. Furthermore, the mainlobe part 50 of the Doppler wave 300 includes a condition of (fd+B)<PRF/4.

It should be noted the difference between FIG. 3 and FIG. 4 lies in the movement of the moving object. It is illustrated in FIG. 4 that when the object is moving, the mainlobe part 50 and the sidelobe parts 60 and 60a all move with identical distances, which are still within the range of the low-pass cut-off frequency, PRF/4. As a result, the object moves in a higher speed can also be detected according to an embodiment of the present invention.

According to an embodiment of the present invention, in step S107, the ultrasound Doppler detection is formed according to the mainlobe part 50 and the flow information of the moving object is obtained, wherein the flow information is selected from the group of a flow speed and a flow direction. The ultrasound detection can be further utilized in other embodiments of ultrasound imaging; however, there are many methods of imaging according to the present technology and thus will not be mentioned here.

In conclusion, the ultrasound Doppler detection method with Golay-encoded excitation according to embodiments of the present invention provides a method with the filter having the low-pass cut-off frequency of PRF/4 in Doppler frequency domain to filter out sidelobes generated due to the compression of Golay code. As a result, Golay code can be utilized in Doppler detections for objects moving in higher speed.

While the present invention has been particularly shown and described with reference to a preferred embodiment, it will be understood by those skilled in the art that various changes in form and detail may be without departing from the spirit and scope of the present invention.

What is claimed is:

1. An ultrasound Doppler detection method with Golay-encoded excitation for obtaining flow information of a moving object, the method comprising following steps:
   (a) transmitting a first Golay code to the moving object for a first reflection signal;
   (b) after a pulse repetition interval, transmitting a second Golay code to the moving object for a second reflection signal, wherein the reciprocal of the pulse repetition interval is a pulse repetition frequency;
   (c) repeating step (a) and then step (b) for N times to obtain N first reflection signals and N second reflection signals;
   (d) performing a first match-filtering on the first reflection signals to generate N first waves, performing a second match-filtering on the second reflection signals to generate N second waves, wherein each of the first waves includes a first mainlobe and a plurality of first sidelobes, and each of the second waves includes a second mainlobe and a plurality of second sidelobes;
   (e) analyzing the first waves and the second waves in a Doppler frequency domain of a slow-time to generate a Doppler wave, wherein the Doppler wave includes a mainlobe part and at least a sidelobe part, the mainlobe part includes the first mainlobe and the second mainlobe, and the sidelobe part includes the first sidelobes and the second sidelobes;
   (f) low-pass filtering out the first sidelobes of the first waves and the second sidelobes of the second waves by a filter, wherein a low-pass cut-off frequency of the filter is a quarter of the pulse repetition frequency; and
   (g) forming the ultrasound Doppler detection according to the first mainlobes of the first waves and the second mainlobes of the second waves.

2. The detection method according to claim 1, wherein the difference between the sidelobe part and the mainlobe part is half of the pulse repetition frequency.

3. The detection method according to claim 1, wherein in step (d), the first match-filtering and the second match-filtering are performed in a fast-time.

4. The detection method according to claim 1, wherein the filter includes a low-pass filter.

5. The detection method according to claim 1, wherein the first mainlobe and the second mainlobe are in-phase waves and the first sidelobes and the second sidelobes are out-of-phase waves.

6. The detection method according to claim 1, wherein the mainlobe part includes a center frequency and a half bandwidth, and the sum of the center frequency and the half bandwidth is less than a quarter of the pulse repetition frequency.

7. The detection method according to claim 1, wherein the flow information is selected from the group of a flow speed and a flow direction.

* * * * *